United States Patent [19]
Traylor

[11] 3,773,347
[45] Nov. 20, 1973

[54] AXLE ATTACHMENT FITTING
[75] Inventor: Charles O. Traylor, Springfield, Mo.
[73] Assignee: Hutchens Industries, Springfield, Mo.
[22] Filed: Apr. 12, 1972
[21] Appl. No.: 243,221

[52] U.S. Cl. .......................... 280/124 R, 267/52 X
[51] Int. Cl. ............................................ B60g 11/62
[58] Field of Search ....................... 267/52; 280/124

[56] References Cited
UNITED STATES PATENTS
3,630,541  12/1971  Carlson ............................ 267/52 X
2,907,579  10/1959  Masser ............................... 280/124

Primary Examiner—Philip Goodman
Attorney—John W. Malley et al.

[57] ABSTRACT

An assembly for suspending a vehicle utilizing rigid arms pivotally attached at one end to each side of the vehicle with the other end mating with columnar springs. The axle is held in mounting brackets fixed to the rigid members and is allowed limited resilient freedom of movement in any direction. Rigid bars are attached to the front and rear of the axle within each mounting bracket and are in concentric relation to the axle. A clearance is provided between the bars and the mounting brackets to allow limited movement of the axle before the bars come in contact with the mounting brackets due to forces caused by road irregularities or rapid deceleration of the vehicle. The rigid bars provide a large contact area with resultant low stresses and are positioned so that the load path is concentric with the axle, thus, the roll moment induced in the axle is adequately reacted.

9 Claims, 9 Drawing Figures

AXLE ATTACHMENT FITTING

BACKGROUND OF THE INVENTION

1. Field of the Invention:

This invention relates to vehicle suspension systems and more particularly to an assembly for mounting an axle in a suspension system.

2. Prior Art

In vehicles having multiple axle running gear, several means have been devised for suspending the vehicle in a stable manner while allowing the axle or axles to articulate due to road conditions. One of the problems encountered when attempting to suspend a vehicle in the above-described manner is high stresses in the interacting assemblies with resultant accelerated failure of the parts.

When a vehicle is suspended by the standard leaf spring assembly, the axle can be rigidly clamped to the springs because the leaf springs, although flexible enough to properly suspend the vehicle and to allow the axle to properly articulate due to road conditions, are also rigid enough to keep the axle properly positioned without any additional supporting member.

With the use of air, rubber, coil, volute or other columnar springs to suspend a vehicle, however, new problems are created in that a rigid member has to be used to support the axle since columnar springs have no inherent lateral stability. When a rigid member is used, an axle must be resiliently isolated from the member in order to prevent high stresses in the interacting parts and to allow the axle limited freedom of movement in all directions as with the leaf spring suspension system.

If the axle were supported only by the resilient means mentioned above, it would have a tendency to roll as the vehicle brakes are applied, thus putting high stresses in the axle assembly itself. Several designs have been employed to take care of this condition, such as in the U.S. Pat. No. 2,907,579. However, since the limited freedom of movement for the axle is essential before a metal to metal contact is allowed between the axle and its mounting bracket, considerable wear occurs in the interacting parts of the above-mentioned designs due to high stresses.

SUMMARY OF THE INVENTION

The present invention allows the axle to articulate due to road irregularities and the like while transmitting larger forces from the axle to its mounting in such a manner as to minimize the stresses in the interacting parts and thus extend their useful life. This is achieved by the use of rigid members attached concentrically to the front and rear of the axle adjacent both sides of the vehicle and confined within the mounting brackets which are attached to the rigid arms. Additionally, the axle is supported by resilient pads placed above and below the axle within the mounting brackets, which pads allow the axle limited freedom of movement before the rigid members contact the mounting bracket. The rigid members are positioned in such a way as to contact the mounting bracket so that the load path is concentric with the axle, thus, no roll moment is induced which would increase the stresses in the interacting parts.

DESCRIPTION OF THE PREFERRED EMBODIMENT

Figure 1:
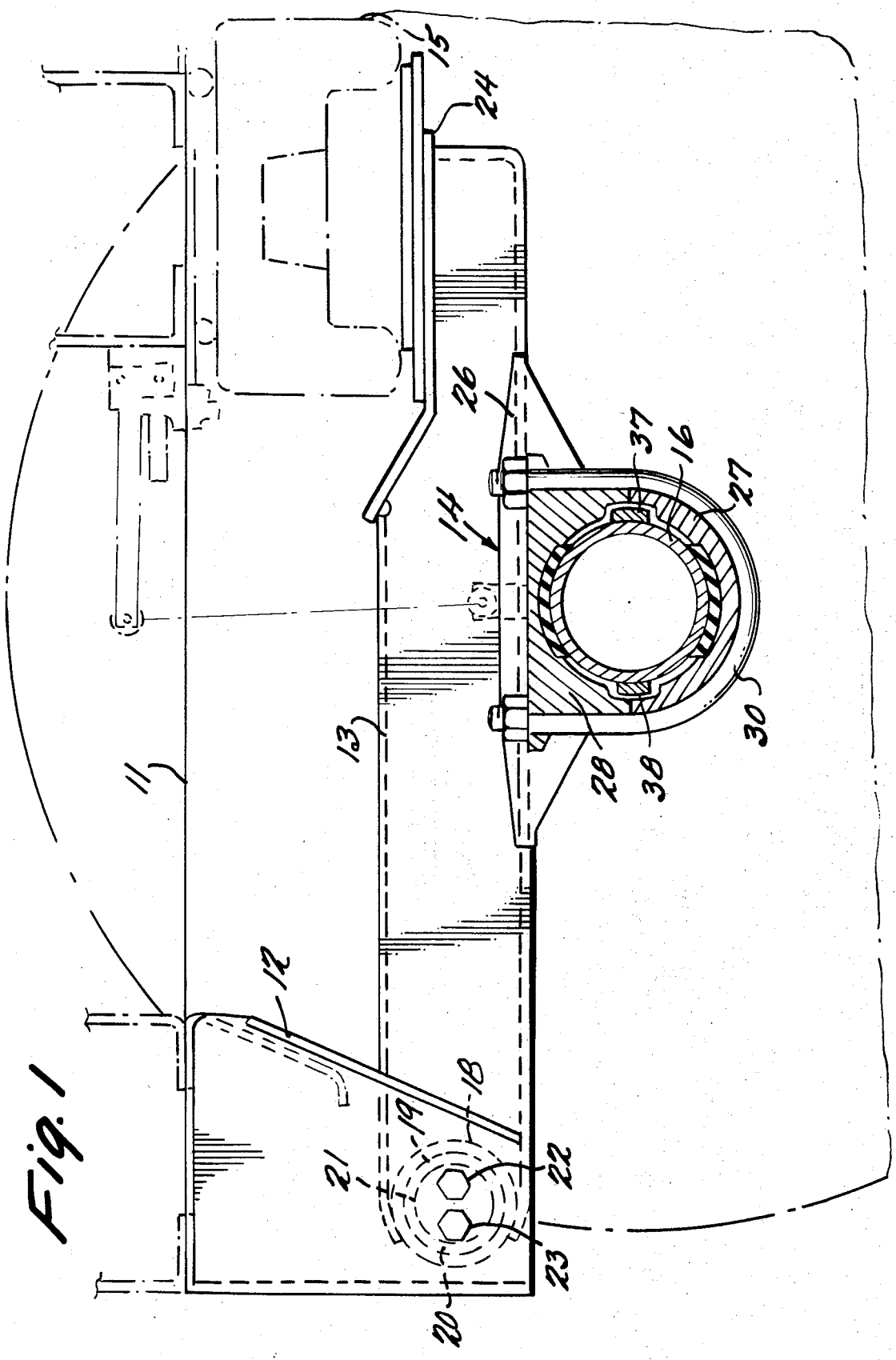
FIG. 1 is a view partially in elevation and partially in section showing an axle arrangement with the axle attachment of this invention, the rear wheels being removed to show the suspension structure.

FIG. 1 shows the frame of an automotive vehicle 11 with a bracket 12 attached to the frame to support the rigid arm 13 to which the rigid axle mounting bracket assembly 14 is attached, a spring suspension means 15, here shown as an air spring, and a vehicle having an axle 16. The axle 16 although shown in its preferred embodiment as one of circular cross-section, may be of rectangular cross-section or any other cross-section commonly used for axles of the type herein referred to.

The rigid arm 13 herein shown with a generally rectangular cross-section, but may be of any suitable common beam cross-section, with a hollow circular tube 18 rigidly attached to one end having a large enough internal diameter 19 to accomodate a rubber bushing 20 which will resiliently support rigid arm 13 when attached to bracket 12. Circular rod 21 extends through circular tubing 18 and is attached to bracket 12 by bolts 22 and 23 so as to pivotally support rigid arm 13 when assembled. At the opposite end of rigid arm 13 a flat plate 24 is attached to accommodate an air spring 15 or other columnar spring.

Figure 3:
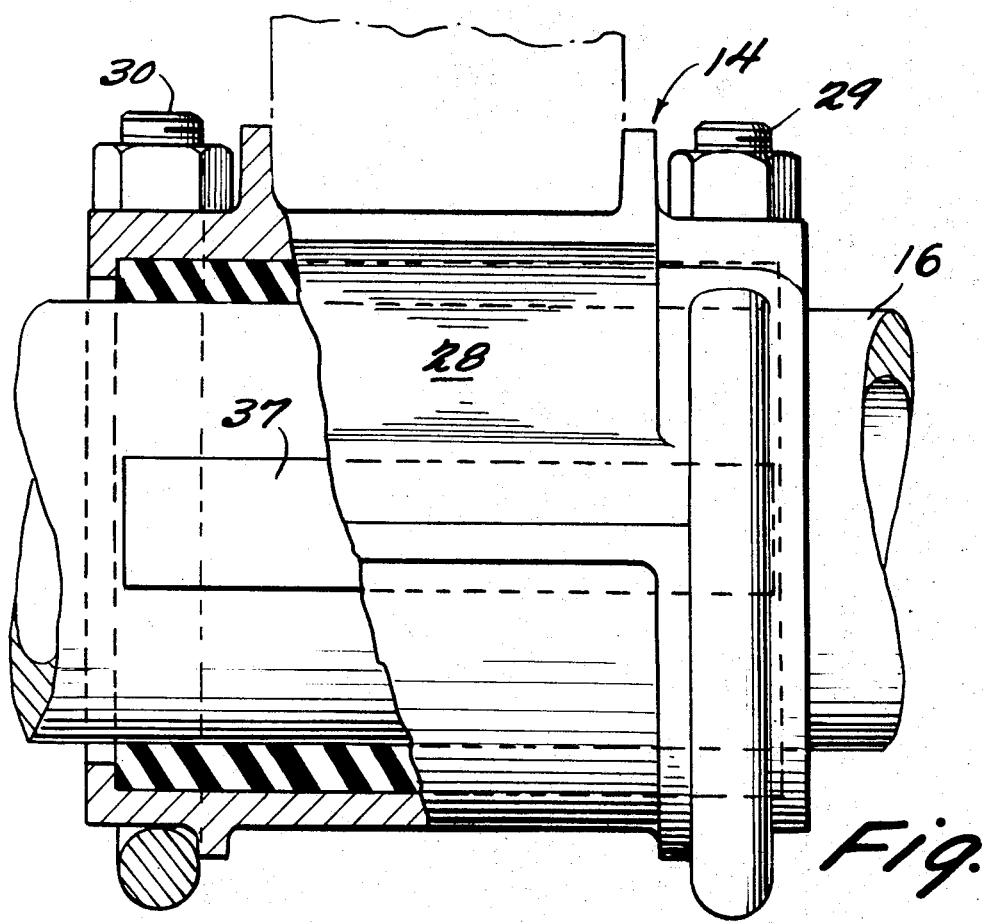
FIG. 3 is a view along the axis of the axle partially in elevation and partially in cross-section illustrating the axle attachment.

The axle mounting bracket 14 is attached to the rigid arm 13 by welding or the like along the mating edge 26 or may be an integral part of the rigid arm 13. The axle mounting bracket 14 separates along the horizontal axis of the axle so that lower portion 27 may be removed to insert or remove the axle 16. The lower member 27 is secured to the upper member 28 by means of U-bolts 29 and 30 (FIG. 3).

Figure 2:
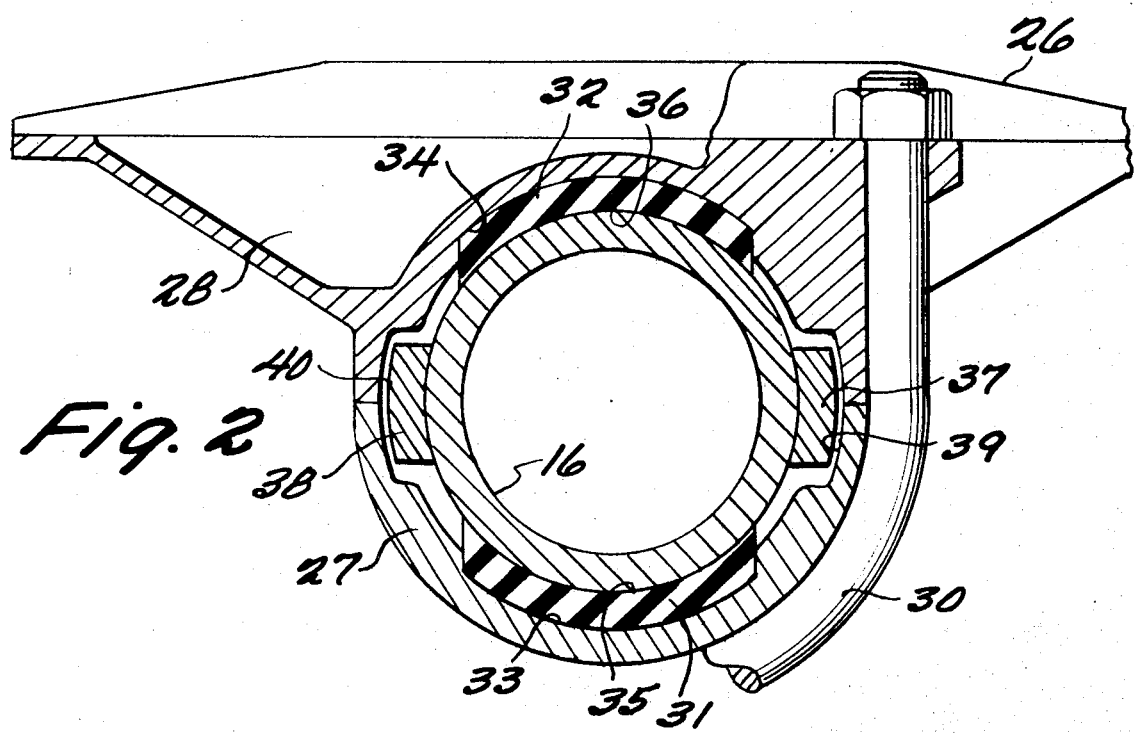
FIG. 2 is an enlarged cross-sectional view transverse to the axis of the axle illustrating the axle attachment and mounting members.

Referring now to FIG. 2, resilient pads 31 and 32 made of rubber or the like are positioned above and below the axle and fitted into recesses 33 and 34 in the axle mounting bracket 14 so as to properly position the pads. The internal surfaces of the pads 35 and 36 conform to the external periphery of the axle 16. The rigid means herein shown as bars 37 and 38 are attached as weldments or the like to the axle 16 and extend longitudinally along the axis of the axle 16 within the axle mounting bracket 14 as shown in FIG. 3.

Referring again to FIG. 2, the rigid bars 37 and 38 have arcuate outer peripheral surfaces 39 and 40 concentric with the axis of the axle. The upper and lower members 27 and 28 of the axle mounting bracket 14 have internal peripheral surfaces corresponding to those of the rigid bars 37 and 38 with equal clearance between the lateral surfaces of said rigid bars and the axle mounting bracket.

Figure 4:
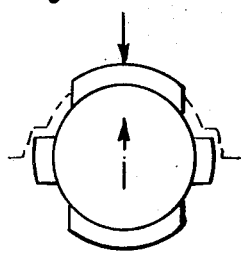
FIG. 4 is a schematic diagram showing the axle and rubber pads under vertical loading conditions.

Referring now to the manner in which the invention functions, an important aspect of the invention is the manner in which forces are transmitted from the axle 16 to the axle mounting bracket 14. Under ordinary operating conditions, road irregularities cause vertical forces to be applied to the axle 16 and transmitted to the axle mounting bracket 14 through the rubber pads 32 and 33 as shown in FIG. 4. Safety is insured in the ultimate condition by simultaneous contact of the axle and reaction bars upon the mounting bracket. Reversed loads are transmitted in a similar manner.

Figure 5:
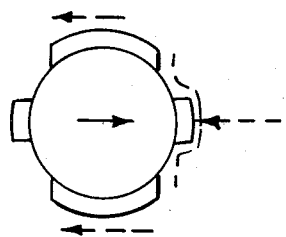
FIG. 5 is a schematic diagram showing the axle and rubber pads under horizontal loading conditions.

Horizontal loads as shown in FIG. 5 which loads also occur under normal operating conditions, are again resisted flexibly by the rubber pads, and as the load increases a portion of it is borne by the rigid members over a large finite area. As with the vertical loading condition the load path is concentric with the axle, thus, no roll moment is induced.

Figure 6:
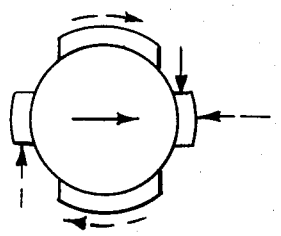
FIG. 6 is a schematic diagram showing the axle and rubber pads under combined horizontal and torsional loading conditions.

A condition more severe than that which occurs under normal road conditions yet similarly important is the effect of application of the vehicle's brakes. When this occurs, a condition similar to that shown in FIG. 6 exists where there is a combined horizontal or torsional load.

This load is transferred first through shear loading in the rubber pads and later as the magnitude of the force increases the horizontal component is reacted on the outer arcuate peripheral surfaces of the rigid members as with purely horizontal loads, while the torsional component is reacted by a couple acting on the lateral surfaces of the rigid members. The forces which are transmitted under these conditions are applied over a large finite surface area thus reducing the stress and wear on the parts.

Figure 8:
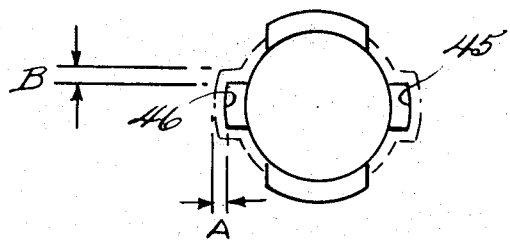
FIG. 8 is a schematic diagram showing the relative positions and clearance between the axle, rubber pads and mounting bracket.

An additional advantage of this invention under combined horizontal and torsional loading conditions is the fact that although wear is anticipated to some extent on the outer peripheral surfaces 45 and 46 as shown in FIG. 8, thus increasing the clearance dimension A, the roll characteristics will not be affected since the allowable rotation is determined by dimension B.

Figure 7:
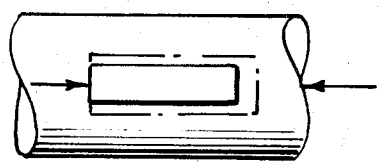
FIG. 7 is a schematic diagram showing the axle and rigid members with loads applied along the axis of the axle.

Loads which occur along the axis of the axle as shown in FIG. 7 are initially resisted by shear in the rubber pads while ultimate resolution is made by direct impingement of the end surface of the rigid member on the mating surface of the mounting bracket and in a plane parallel to the longitudinal axis of the axle. Note here also, that because of the symmetry of the rigid members, no roll inducing moments are created thus increasing the wear and durability of the parts.

Figure 9:
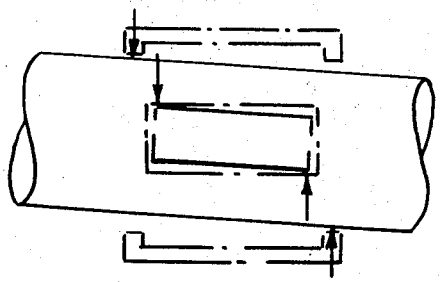
FIG. 9 is a schematic diagram showing the mounting bracket, rigid members and axle under lateral loading conditions.

Under normal operating conditions road irregularities cause the axle to rock about its axis as shown in FIG. 9. The rubber pads allow limited freedom of movement in this direction until the force becomes large enough to allow the axle to contact the mounting bracket. An additional feature of this invention is the simultaneous contact of the rigid members and the axle housing on the mounting bracket thus lowering stresses created by this condition.

Although the foregoing description illustrates the preferred embodiment of the present invention, it will be apparent to those skilled in the art that variations are possible. All such variations as would be obvious to those skilled in this art are intended to be included within the scope of this invention.

What is claimed is:

1. An axle structure for a vehicle with ground engaging wheels comprising:

a rigid arm adapted to be secured to the underside of a vehicle and having means for receiving spring means for suspension of the vehicle, an axle having concentric portions and adapted to be disposed transversely of said rigid arm, a rigid assembly for surrounding the axle including; an upper member fixed with respect to said rigid arm and a lower member detachably fixed to said upper member to permit said assembly to be mounted in said surrounding relation to the axle, said assembly providing interior peripheral surfaces disposed in a spaced relation to the exterior peripheral surface of the axle when disposed in said surrounding thereto, resilient means for positioning the axle in said spaced relation and for transmitting forces between the axle and said rigid assembly and yieldingly controlling relative translational, rotational or angular movements therebetween, said resilient means having portions disposed above and below the axle in engagement with the interior peripheral surface of said rigid assembly and having interior surfaces conforming to the exterior peripheral surface of said concentric portions of the axle, rigid means fixedly secured to the exterior peripheral surface of the axle, disposed forwardly and rearwardly of the axle for engaging said rigid assembly after a limited relative axial, translational, rotational or angular movement there-between and having lateral surfaces which engage said rigid assembly on diameterically opposed positions of said axle in rotation thereby transmitting forces between the axle and said rigid assembly in such a manner as to be generally concentric about the axis of the axle.

2. The axle structure of claim 1 wherein said rigid arm is adapted to be resiliently pivotally attached at one end to said vehicle and an opposite end is adapted to be attached to a columnar spring.

3. The axle structure of claim 1 wherein said rigid means are symmetrical about horizontal and vertical planes passing through the axis of the axle.

4. The axle structure of claim 3 wherein said rigid means have outer arcuate peripheral surfaces concentric with the axle and said lateral surfaces extend from the exterior peripheral surface of the axle and extend axially within the limits of said rigid assembly.

5. The axle structure of claim 3 wherein said resilient means are symmetrical about horizontal and vertical planes passing through the axis of the axle.

6. The axle structure of claim 5 wherein said resilient means have vertically disposed surfaces corresponding to like surfaces in said rigid assembly when positioned therein.

7. The axle structure of claim 4 wherein said upper and lower members of said rigid assembly have inner lateral surfaces corresponding to the lateral surfaces of said rigid means and inner arcuate peripheral surfaces corresponding to said outer arcuate peripheral surfaces of said rigid means, all of said corresponding surfaces being disposed in a spaced relation.

8. The axle structure of claim 1 wherein said rigid means includes bars fixedly secured to the front and rear of the axle in positions symmetrical about horizontal and vertical planes passing through the axis of the axle.

9. The axle structure of claim 1 wherein said rigid arm is a member having a generally rectangular cross-section and is adapted to be resiliently pivotally attached at one end to said vehicle and an opposite end is adapted to be attached to a columnar spring, said upper and lower members of said rigid assembly having inner lateral surfaces corresponding to the lateral surfaces of said rigid means and inner arcuate peripheral surfaces corresponding to said outer arcuate peripheral surfaces of said rigid means, all of said corresponding surfaces being disposed in a spaced relation, said resilient means being symmetrical about horizontal and vertical planes passing through the axis of the axle and having vertically disposed surfaces corresponding to like surfaces in said rigid assembly, said rigid means being bars fixedly secured to the front and rear of the axle so as to be symmetrical about horizontal and vertical planes passing through the axis of the axle and having outer arcuate peripheral surfaces concentric with the axle and lateral surfaces extending from the exterior peripheral surface of the axle and extending axially within the limits of said rigid assembly.

\* \* \* \* \*